Figure 1:
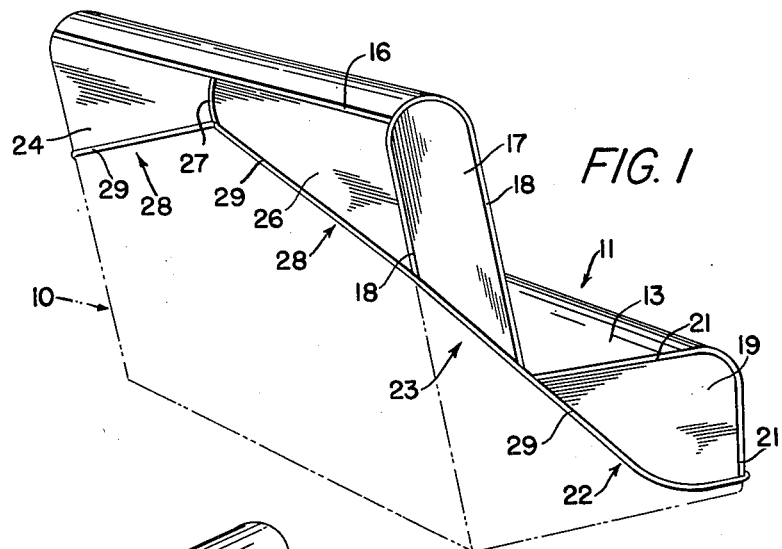

Nov. 25, 1952  N. R. SEAMAN  2,619,156
SEAT COVER
Filed Feb. 2, 1951  3 Sheets-Sheet 1

INVENTOR.
NORMAN R. SEAMAN
BY
ATTORNEYS

Nov. 25, 1952 N. R. SEAMAN 2,619,156
SEAT COVER
Filed Feb. 2, 1951 3 Sheets-Sheet 2
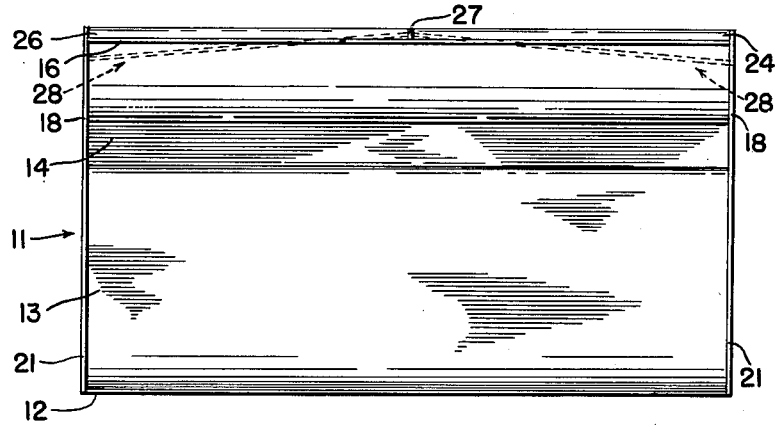
FIG. 3
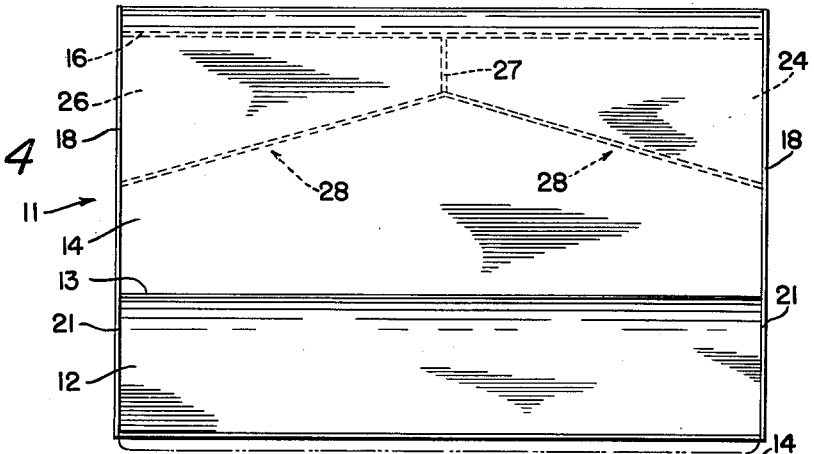
FIG. 4
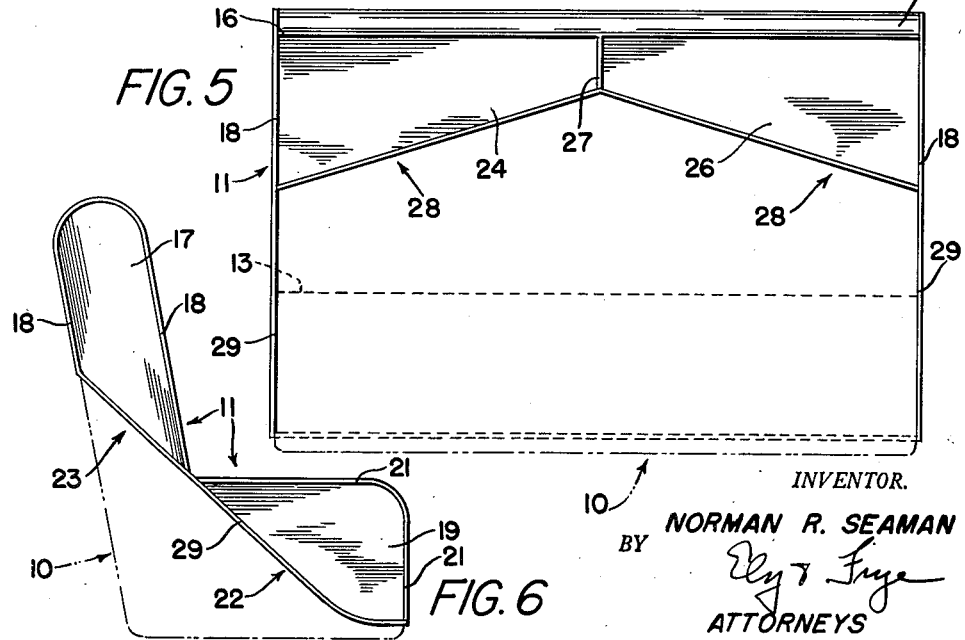
FIG. 5
FIG. 6
INVENTOR.
NORMAN R. SEAMAN
BY
ATTORNEYS Nov. 25, 1952 N. R. SEAMAN 2,619,156
SEAT COVER
Filed Feb. 2, 1951 3 Sheets-Sheet 3
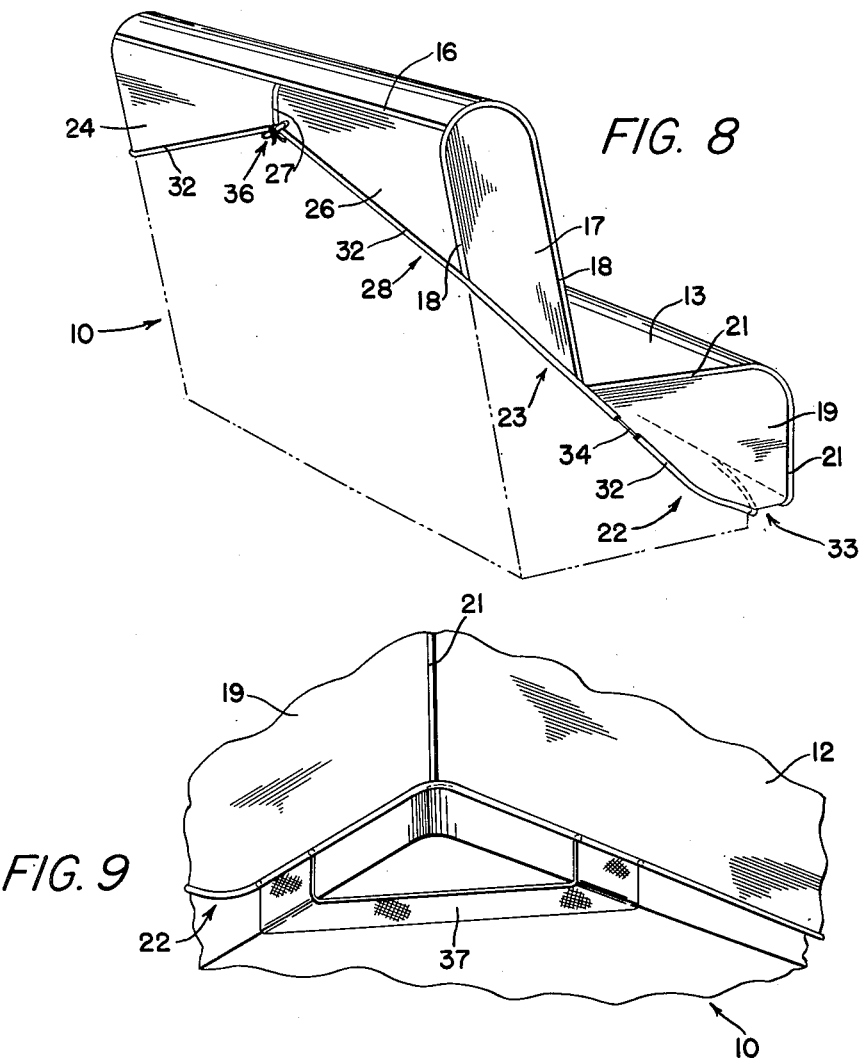
INVENTOR.
NORMAN R. SEAMAN
BY
*Ely & Frye*
ATTORNEYS Patented Nov. 25, 1952

2,619,156

UNITED STATES PATENT OFFICE 2,619,156

SEAT COVER

Norman R. Seaman, Canal Fulton, Ohio

Application February 2, 1951, Serial No. 209,105

14 Claims. (Cl. 155—182)

This invention relates to seat covers and, in particular, to covers for front seats of motor vehicles. Currently, it has been found desirable to provide water-proof covers for auto seats for special occasions such as occupancy while wearing bathing attire or soiled clothing, or to guard against untidiness of children, etc., and the modern plastic sheeting has been found useful in this regard. To provide for such contingencies, relatively loose, "throw-on" covers have been employed, which need no attachment, are for temporary employment, and may be mounted or demounted by anyone with a minimum of effort, and may be stored away in a small package, as in the storing of thin raincoats.

Heretofore, these covers have been constructed more or less along the lines of the traditional seat cover, having a seat, a front apron, side panels, and a shroud which fitted over the seat back and had a generally rectangular back panel, the upper or seat-back portion of the side panels being fastened to the back panel in a generally vertical seam. This resulted in a right-angle corner between such seam and the lower edge of the back panel. Loose covers of the type considered are subject to considerable shifting by movements of the occupants, and I have found that, when subject to such shifting, covers of conventional construction, as just described, present weak points at the right angular corner mentioned, high stresses being set up which exceed the holding power of the side panel seam, with tears, commencing at this point, being of frequent occurrence.

I have found that by revising the contour of the lower edges of the cover on either side of the critical point, the trouble is effectively eliminated. Further, as a consequence of this structural change in the cover, I have been able to appreciably reduce the amount of sheet material required for the cover, and thus to reduce its cost.

It is, therefore, a principal object of the invention to materially lengthen the life of seat covers. A further object is to inhibit the stresses in seat covers which tend to initiate tears in the seams. More particularly it is an object to provide a seat cover in which marginal edges are arranged in a manner to minimize stresses incident to normal use of the cover. Yet another and related object is to provide a seat cover of improved strength while reducing the amount of material required.

Figure 2:
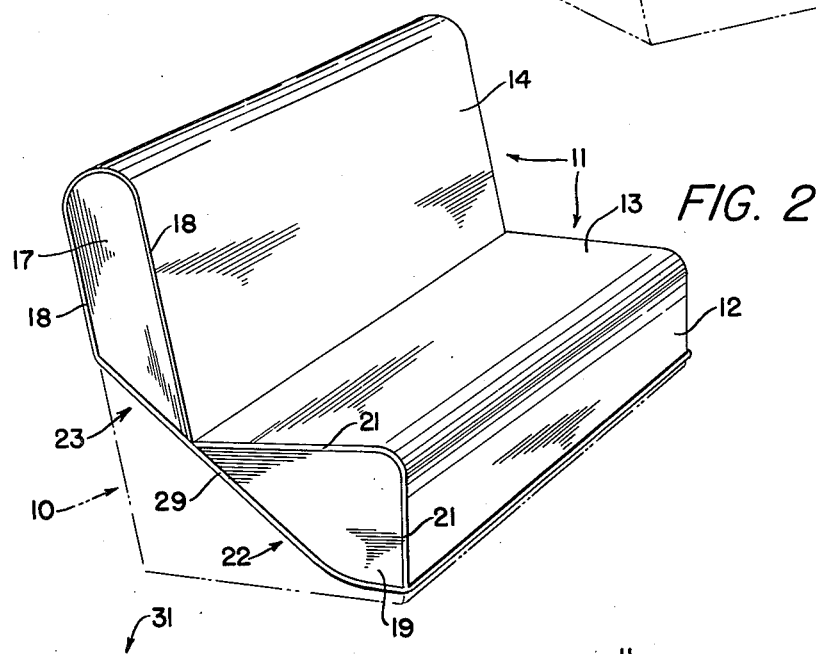
Figure 7:
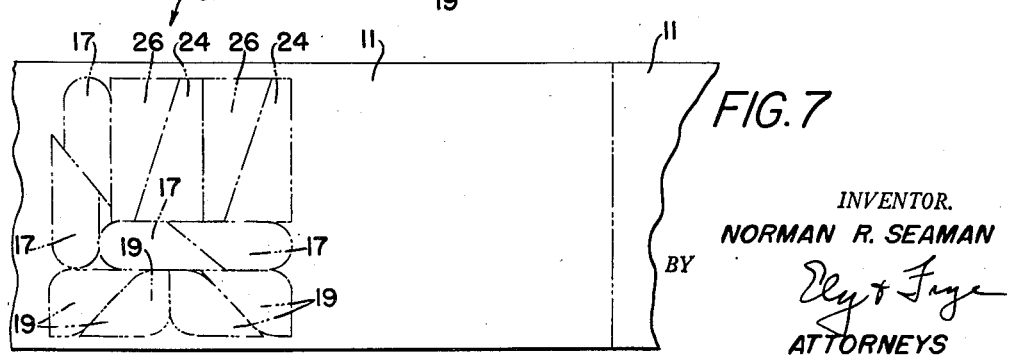

These and other ends are attained by the invention, one preferred form of which is described in the specification to follow and illustrated in the drawings, in which:

Fig. 1 is a perspective view of a seat cover mounted on a seat, indicated in broken lines, as viewed from the side and rear, Fig. 2 is a view similar to Fig. 1, as viewed from the side and front, Fig. 3 is a top plan view of Figs. 1 and 2, Fig. 4 is a front elevational view of Figs. 1 and 2, Fig. 5 is a rear elevational view of Figs. 1 and 2, Fig. 6 is a side elevational view of Figs. 1 and 2, Fig. 7 is a plan view of the sheet material for the cover, showing the pattern of cuts for the several parts thereof, Fig. 8 is a view similar to Fig. 1, showing a modification, and Fig. 9 is a view similar to Fig. 8, showing a further modification.

Referring to the drawings by characters of reference, there is shown generally at 10, in dotted lines, a typical front auto seat, which may or may not be provided with the conventional seat cover of semi-permanent installation. Over the seat 10 is shown draped an auxiliary, loose-fitting cover having an integral strip 11 which forms a front apron 12, a seat portion 13 and a back rest portion 14. The strip continues over the top of the back of the seat to a seam 16 extending from one end of the seat to the other. The termination of sheet 11 at this line has no significance beyond the expedients incident to the available width of sheets. These strips are cut from continuous lengths of material contained on rolls. As conveniently available, the width of these sheets is not sufficient to span the width of most auto seats and, therefore, the proper widths for seat covers are cut as lengths of sheeting, the normal side edges of the sheeting thus occurring in the cover at seam 16 and at the bottom of apron 12.

Each side of the cover comprises two panels. One, indicated by the numeral 17, lies at the side of the seat back and is secured by a seam 18. The other, numbered 19, occurs at the side of the seat proper and is joined by a seam 21. Panel 19 converges rearwardly, with its lower edge 22 slanted upwardly along a line which substantially intersects the line of intersection of the front of the seat back with the top of the seat proper. Panel 17 also has a slanted lower edge 23 which is positioned in substantially rectilinear continuation of edge 22.

Secured to the rearward edge of sheet 11, at seam 16, is a pair of panels 24, 26, which are also secured to side panel 17 at seam 18 and which are united at their inner ends along a vertical seam 27. Each back panel diverges outwardly of the center seam, having a slanted, lower edge 28 which is generally aligned with the line of lower edges 22, 23 of the side panels.

The entire lower edge of the cover, along the bottom of apron 12, edges 22, 23 and 28, is reinforced by a tape 29.

In covers used heretofore, the side panels such as 17 and 19 extended to the bottom of the seat, or substantially below the top surface of the seat. Also, the back panel has been strictly rectangular; that is, its bottom edge extended in a straight line from side panel to side panel. Where this edge met the seam at the rear of the side panel, it therefore made a right angle therewith. With this arrangement, shifting of any of the body-contacting portions of the cover set up highly critical stresses at this right angular corner which resulted in tearing of the seam equivalent to the rear part of seam 18.

According to the present arrangement, any tug on the seat cover due to body contact of an occupant is carried along edges 22 or 23, or both, and since lower edge 28 of the back panel is in more or less direct line with edges 22, 23, the pull is transmitted across seam 18, without detriment thereto, being absorbed along edge 28.

A further advantage of the seat cover of this invention lies in the saving of material. It will be noted that the side panels have been reduced in area by about one-half, and that the back panel has been materially reduced in area. The elimination of these portions is permissible in covers intended for occasional use only, since only the seat portions subject to body contact need be protected.

Not only is material saved by elimination of parts of the finished product, but it has been found that the forms of the back and side panels lend themselves more efficiently to pattern layouts designed for minimum scrap.

Such a layout is shown in Fig. 7, showing a strip of the rolled material, with the lines to be cut indicated by broken lines, and with the several panels indicated by the same reference characters employed in the foregoing description. The panel 11, of course, takes up the full width of the strip and is rectangular in form. All other pieces are cut from a rectangle indicated generally by the numeral 31, the several odd-shaped pieces being arranged to good advantage to minimize scrap. In this regard it has been found expedient to provide for cutting such panels in sufficient number for two seat covers from a single rectangle, such as 31, and such case is illustrated in Fig. 7.

The benefits of the present invention are manifold, in addition to those set forth. It enables, first of all, the use of a material of minimum weight (thickness) while maintaining the quality and also the strength at the critical regions, with resultant long wear in service. There is a saving in labor over that already mentioned, since the conventional seat cover would involve a seam between the side panels similar to panels 17 and 19. Throw-on seat covers are folded for storage and one serious problem in thus folding is the elimination of trapped air. The shroud which covers the seat pack provides a pocket in which the entrapment of air is especially troublesome and in the present seat cover this factor has been minimized by the V form of the back which effectively reduces the volume of the pocket. Certain auto seats have ash trays in the back and the V form is also useful in permitting these ash trays to remain exposed.

It should be noted that the angular arrangement of the lower edges at the side and the back, respectively, each contribute separately to the improved results, and when both are employed the optimum results are obtained. Thus, either may be employed alone in a seat cover which presents substantial improvement over conventional covers, for in either case the right angular meeting point is modified to reduce the tendency to tear.

While the edges 22, 23 have been defined as substantially aligned, obviously this condition is susceptible of modification without substantial sacrifice of the improved results. Also, where the bottom edge of the back is referred to as substantially aligned with the bottom edges of the side, this has reference to a seat cover, per se, apart from the seat in which condition such edges, together with strip 29, may be brought into a single plane. When mounted on a seat, of course, the lower edges of the side and back, respectively form an angle. In particular, when the lower edge of the back is straight and horizontal, this angle defines a plane which is substantially perpendicular to the vertical plane of the side of the seat. However, when the lower edge of the back is inclined to the horizontal, the defined plane is inclined at an angle to the vertical plane of the side panel. In the arrangement shown and described in this application, the defined plane makes an acute angle with that portion of the vertical plane of the side panel which lies below its line of intersection with the said defined plane. In particular, where the bottom edge of the back is such that it is directly aligned with the bottom edge of the side when the side and back are brought into a single plane, the angle between the defined plane and the back, above said defined plane, would be equal to said acute angle on the side. Or, more simply stated, it is desirable that edges 23 and 28 make equal angles with a horizontal plane. This definition is independent of the dihedral angle between the side and back of the seat. Obviously, due to the proportions of the seat, this exact situation may not, in general, be realized in practice, but represents an ideal condition to which approach is to be made. The angles in panels 17 and 26, for instance, may differ by as much as 30° or more.

A modified form of seat cover is shown in Fig. 8, in which a hem 32 is substituted for the tape 22 around the lower edge of the seat cover. The front apron depends sufficient so that it and the side panel may be tucked under the lower, front corners of the seat, as at 33, and a drawstring 34, threaded through the hem is tied, as at 36, at the apex of the V bottom of the back panels. This arrangement also utilizes and is peculiarly adapted to the straight line pull on the lower edges 22, 23, 28 of the cover. Obviously an elastic cord may be employed instead of drawstring 34. If necessary, panels 24, 26 may be increased in size, or the position of seam 16 moved forward, or both, to provide the additional reach required in the apron. Alternatively, a corner strap 37 may be employed to engage under the seat corners, as shown in Fig. 9.

Whereas the features of the invention are illustrated in connection with a seat cover having a single shroud for the seat back, the same principles may be applied to a seat cover having separate shrouds for draping over the respective backs of split seats.

While a certain preferred embodiment has been shown and described, the invention is not limited thereby since changes in the exact size, shape and arrangement, for instance, of the various parts may be resorted to without departing from the scope of the invention.

What is claimed is:

1. In a seat cover, a main body portion, and side panels attached to the side edges thereof, said main body portion having a looped section adapted to be draped over a seat back, the lower edge of said looped portion behind said seat comprising two straight-line edges and being nearer to the top of said looped portion at the center thereof than at the edges thereof and being permanently connected to said side panels.

2. A seat cover comprising a main body portion, a side panel attached to the side edge of said main body portion, having a lower edge slanting upwardly in a rearward direction and a back portion defining a pocket with the said main body portion, the lower edge of the back portion forming a continuation of the lower edge of said side panel, and forming an angle with the lower edge of said side panel defining a plane which is inclined at an acute angle to said side panel on the underside of said defined plane.

3. A seat cover comprising a main body portion, a side panel attached to the side edges of said main body portion, and a back portion defining a pocket with the said main body portion, the lower edge of the back portion forming a continuation of the lower edge of said side panel, and forming an angle with the lower edge of said side panel defining a plane which is inclined at an acute angle to said side panel on the underside of said defined plane, said lower edges comprising a hem enclosing means for contracting the length of said edges.

4. A seat cover comprising a main body portion having a depending, front apron, a side panel attached to said apron and having a lower edge which converges toward the top edge of said panel from front to rear, and means to secure the corner defined by said side panel and said apron under the lower corner of a seat.

5. A seat cover comprising a main body portion having a depending, front apron, a side panel attached to said apron and having a lower edge which converges toward the top edge of said panel from front to rear, and means to secure the corner defined by said side panel and said apron under the lower corner of a seat, said means comprising a hem on the lower edge of said side panel and resilient means in said hem to shorten the effective length of the hem.

6. A seat cover comprising a main body portion having a seat portion, a front apron, and a looped portion adapted to be draped over the back of a seat, and side portions connected to the edges of said main body portion, each of said side portions having a panel adjacent said seat portion and front apron, the lower edge of which converges toward its upper edge from front to rear, and a panel connected to the edge of said looped portion, the lower edge of said latter panel converging toward the front of the looped portion in a downward direction, and a reinforcing means on the lower edges of said panels and connecting said edges in substantially rectilinear alignment.

7. A seat cover comprising a main body portion having a seat portion, a front apron, and a looped portion adapted to be draped over the back of a seat, and side portions connected to the edges of said main body portion, each of said side portions having a panel adjacent said seat portion and front apron, the lower edge of which converges toward its upper edge from front to rear, and a panel connected to the edge of said looped portion, the lower edge of said latter panel converging toward the front of the looped portion in a downward direction, and a reinforcing means on the lower edges of said panels and connecting said edges in substantially rectilinear alignment, the meeting line of said seat portion and said looped portion being located in close proximity to the line of said lower edges of said panels.

8. A seat cover comprising a main body portion having a seat portion, a front apron, and a looped portion adapted to be draped over the back of a seat, and side portions connected to the edges of said main body portion, each of said side portions having a panel adjacent said seat portion and front apron, the lower edge of which converges toward its upper edge from front to rear, and a panel connected to the edge of said looped portion, the lower edge of said latter panel converging toward the front of the looped portion in a downward direction, and a reinforcing means on the lower edges of said panels and connecting said edges in substantially rectilinear alignment, the lower edge of said looped portion, rearwardly of said seat back, having an inverted V form.

9. A seat cover comprising a main body portion having a seat portion, a front apron, and a looped portion adapted to be draped over the back of a seat, and side portions connected to the edges of said main body portion, each of said side portions having a panel adjacent said seat portion and front apron, the lower edge of which converges toward its upper edge from front to rear, and a panel connected to the edge of said looped portion, the lower edge of said latter panel converging toward the front of the looped portion in a downward direction, and a reinforcing means on the lower edges of said panels and connecting said edges in substantially rectilinear alignment, the lower edge of said looped portion, rearwardly of said seat back, having an inverted V form and being substantially aligned with the said lower edges of said panels when brought into a common plane therewith.

10. A seat cover comprising a main body portion having a seat portion, a front apron, and a looped portion adapted to be draped over the back of a seat, and side portions connected to the edges of said main body portion, each of said side portions having a panel adjacent said seat portion and front apron, the lower edge of which converges toward its upper edge from front to rear, and a panel connected to the edge of said looped portion, the lower edge of said latter panel converging toward the front of the looped portion in a downward direction, and a reinforcing means on the lower edges of said panels and connecting said edges in substantially rectilinear alignment, the lower edge of said looped portion, rearwardly of said seat back, having an inverted V form and being substantially aligned with the said lower edges of said panels when brought into a common plane therewith, and the meeting line of said seat portion and said looped portion being located in close proximity to the line of said lower edges of said panels.

11. In a seat cover, a main body portion, and side panels attached to the side edges thereof, said panels each comprising a generally wedge-shaped section, with the said sections joined in proximity at their narrow ends and with the lower side of each wedge forming substantially a straight line with the lower side of the other wedge.

12. In a seat cover, a main body portion, and side portions attached to the side edges thereof, said main body portion having a looped portion adapted to be draped over a seat back, and the lower edge of said looped portion behind said seat being nearer to the top of said looped portion at the center thereof than at the edges thereof, and said side portions each comprising a pair of generally wedge-shaped panels with the said panels in close proximity at their narrow ends, and with the lowermost side of the converging portion of one panel aligned with the lowermost side of the converging portion of the other panel.

13. In a seat cover, a main body portion, and side portions attached to the side edges thereof, said main body portion having a looped portion adapted to be draped over a seat back, and said side portions each comprising a pair of generally wedge-shaped panels, with the said panels in close proximity at their narrow ends, and with the lowermost side of the converging portion of one panel aligned with the lowermost side of the converging portion of the other panel, the lower edge of the back part of said looped portion having a generally V-form, inverted, and the respective parts of said lower edge each being substantially aligned with the said aligned sides of the panels when the back part of said looped portion and said panels are brought into a common plane.

14. A seat cover comprising a main body portion, a side panel attached to the side edge of said main body portion, having a lower edge slanting upwardly in a rearward direction, and a back portion defining a pocket with said main body portion, the lower edge of the back portion forming a continuation of said lower edge of said side panel, and said lower edge of said back portion and said lower edge of said side panel being inclined at substantially equal angles to a horizontal plane when in position on a seat.

NORMAN R. SEAMAN.

REFERENCES CITED

The following references are of record in the file of this patent:

UNITED STATES PATENTS

| Number | Name | Date |
| --- | --- | --- |
| 1,836,302 | Bloomfield | Dec. 15, 1931 |
| 1,878,045 | Wedler | Sept. 20, 1932 |
| 2,143,314 | Habel | Jan. 10, 1939 |
| 2,418,092 | Passel | Mar. 25, 1947 |